United States Patent
Yasuda (10) Patent No.: US 7,161,166 B2
(45) Date of Patent: Jan. 9, 2007

(54) SIGNAL CORRECTING METHOD FOR RADIATION IMAGE READ-OUT APPARATUSES

(75) Inventor: Hiroaki Yasuda, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 704 days.

(21) Appl. No.: 09/945,750

(22) Filed: Sep. 5, 2001

(65) Prior Publication Data

US 2002/0028011 A1    Mar. 7, 2002

(30) Foreign Application Priority Data

Sep. 5, 2000   (JP) .............................. 2000-267983

(51) Int. Cl.
*G03B 42/08* (2006.01)
(52) U.S. Cl. ...................... 250/584; 250/586; 250/587
(58) Field of Classification Search ............... 250/584, 250/586, 587
See application file for complete search history.

(56) References Cited

U.S. PATENT DOCUMENTS

| 4,816,679 | A | | 3/1989 | Sunagawa et al. ......... 250/327.2 |
| 4,922,103 | A | | 5/1990 | Kawajiri et al. ......... 250/327.2 |
| 5,596,202 | A | * | 1/1997 | Arakawa ................. 250/484.4 |
| 5,986,279 | A | * | 11/1999 | Dewaele ................ 250/582 |
| 6,259,112 | B1 | * | 7/2001 | Lim .................... 250/581 |

FOREIGN PATENT DOCUMENTS

| EP | 964269 A2 | * | 12/1999 |
| JP | 60-111568 | | 6/1985 |
| JP | 60-236354 | | 11/1985 |
| JP | 1-101540 | | 4/1989 |

OTHER PUBLICATIONS

Patent Abstract of Japan 01-101540 Apr. 19, 1989.

* cited by examiner

*Primary Examiner*—David Porta
*Assistant Examiner*—Shun Lee
(74) *Attorney, Agent, or Firm*—Sughrue Mion, PLLC

(57) ABSTRACT

Light emitted by a stimulable phosphor sheet, on which a radiation image has been stored, is detected with a line sensor comprising line sensor constituting units arrayed such that their certain regions overlap each other. A test image, in which edge patterns are embedded at positions corresponding to the overlapping regions of the line sensor constituting units, is read out, and test image signal components are acquired from each of the line sensor constituting units. Position matching processing is performed on radiation image signal components of a radiation image signal representing the radiation image, which have been obtained from the line sensor constituting units, and in accordance with edge pattern signal components, which represent the edge patterns and are contained in the test image signal components.

5 Claims, 6 Drawing Sheets

SIGNAL CORRECTING METHOD FOR RADIATION IMAGE READ-OUT APPARATUSES

BACKGROUND OF THE INVENTION

1. Field of the Invention

This invention relates to a signal correcting method for use in a radiation image read-out apparatus. This invention particularly relates to a signal correcting method for use in a radiation image read-out apparatus, in which light emitted by a stimulable phosphor sheet is detected with a line sensor.

2. Description of the Related Art

It has been proposed to use stimulable phosphors in radiation image recording and reproducing systems. Specifically, a radiation image of an object, such as a human body, is recorded on a stimulable phosphor sheet, which comprises a substrate and a layer of the stimulable phosphor overlaid on the substrate. Stimulating rays, such as a laser beam, are deflected and caused to scan pixels in the radiation image, which has been stored on the stimulable phosphor sheet, one after another. The stimulating rays cause the stimulable phosphor sheet to emit light in proportion to the amount of energy stored thereon during its exposure to the radiation. The light emitted successively from the pixels in the radiation image having been stored on the stimulable phosphor sheet, upon stimulation thereof, is photoelectrically detected and converted into an electric image signal by photoelectric read-out means. The stimulable phosphor sheet, from which the image signal has been detected, is then exposed to erasing light, and radiation energy remaining thereon is thereby released.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or on a high resolution cathode ray tube (CRT) display device. In cases where the stimulable phosphor sheet, from which the image signal has been detected, is then exposed to the erasing light, and energy remaining on the stimulable phosphor sheet is thereby released, the erased stimulable phosphor sheet is capable of being used again for the recording of a radiation image.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line light source, such as a fluorescent lamp, a cold cathode fluorescent lamp, or a light emitting diode (LED) array, for irradiating linear stimulating rays onto a stimulable phosphor sheet is utilized as a stimulating ray source, and a line sensor comprising a plurality of photoelectric conversion devices arrayed along the length direction of a linear area of the stimulable phosphor sheet, onto which linear area the stimulating rays are irradiated by the line light source, (i.e., the width direction of the stimulable phosphor sheet) is utilized as photoelectric read-out means. Also, the proposed radiation image read-out apparatuses comprise scanning means for moving the stimulable phosphor sheet with respect to the line light source and the line sensor and in a direction, which is approximately normal to the length direction of the linear area of the stimulable phosphor sheet.

In the aforesaid types of radiation image read-out apparatuses, it is necessary for the length of the line sensor to be identical with or longer than the width of the stimulable phosphor sheet. However, it is not always possible to produce the line sensor, which has the length identical with or longer than the width of the stimulable phosphor sheet, with a single production process. Therefore, a line sensor, which has the length identical with or longer than the width of the stimulable phosphor sheet, has heretofore been constituted by arraying a plurality of line sensor constituting units, each of which has a length shorter than the width of the stimulable phosphor sheet, such that certain regions of adjacent line sensor constituting units overlap each other with respect to the direction normal to the length direction of each of the line sensor constituting units. Also, radiation image read-out apparatuses have heretofore been proposed, wherein a plurality of line sensors are utilized, light emitted from a linear area of a stimulable phosphor sheet is detected with each of the line sensors, and an image signal representing a radiation image is obtained from signal values obtained from each of the line sensors.

However, in the radiation image read-out apparatuses described above, the plurality of the line sensor constituting units are arrayed such that certain regions of the line sensor constituting units overlap each other. Therefore, if position matching processing with respect to the width direction of the stimulable phosphor sheet is not performed on signal components having been obtained from the line sensor constituting units, image patterns obtained from the line sensor constituting units will shift, and the image quality of the obtained radiation image will become bad. Also, in the radiation image read-out apparatuses described above, wherein the plurality of the line sensors are utilized, if the position matching processing with respect to the width direction of the stimulable phosphor sheet is not performed on signal components having been obtained from the line sensors, the image patterns obtained from the line sensors will shift, and the image quality of the obtained radiation image will become bad.

SUMMARY OF THE INVENTION

The primary object of the present invention is to provide a signal correcting method for use in a radiation image read-out apparatus, wherein a radiation image is read out from a stimulable phosphor sheet, on which the radiation image has been stored, with a line sensor comprising a plurality of line sensor constituting units, and position matching processing is performed on radiation image signal components of a radiation image signal representing the radiation image, which radiation image signal components have been obtained from the line sensor constituting units.

Another object of the present invention is to provide a signal correcting method for use in a radiation image read-out apparatus, wherein a radiation image is read out from a stimulable phosphor sheet, on which the radiation image has been stored, with a plurality of line sensors, and position matching processing is performed on radiation image signal components of a radiation image signal representing the radiation image, which radiation image signal components have been obtained from the line sensors.

The present invention provides a first signal correcting method for use in a radiation image read-out apparatus, wherein position matching processing is performed on radiation image signal components of a radiation image signal representing a radiation image, which radiation image signal components have been obtained from a plurality of line sensor constituting units in the radiation image read-out apparatus comprising:

i) a line light source for linearly irradiating stimulating rays onto an area of one surface of a stimulable phosphor sheet, on which the radiation image has been stored, the stimulating rays causing the stimulable phosphor sheet to emit light in proportion to an amount of energy stored thereon during its exposure to radiation, ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, the line sensor comprising the plurality of the line sensor constituting units, each of which comprises a plurality of photoelectric conversion devices arrayed along a length direction of the linear area of the stimulable phosphor sheet, the plurality of the line sensor constituting units being arrayed along the length direction of the linear area of the stimulable phosphor sheet such that certain regions of adjacent line sensor constituting units overlap each other, iii) scanning means for moving the stimulable phosphor sheet with respect to the line light source and the line sensor and in a direction different from the length direction of the linear area of the stimulable phosphor sheet, and iv) reading means for successively reading outputs of the line sensor in accordance with the movement in order to obtain the radiation image signal, which represents the radiation image, the method comprising the steps of:

a) reading out a test image, in which edge patterns extending in a direction different from the length direction of the linear area of the stimulable phosphor sheet are embedded at positions corresponding to the overlapping regions of the line sensor constituting units, test image signal components of a test image signal, which represents the test image, being thereby acquired from each of the line sensor constituting units, and b) performing the position matching processing on the radiation image signal components of the radiation image signal representing the radiation image, which radiation image signal components have been obtained from the plurality of the line sensor constituting units, and in accordance with edge pattern signal components, which represent the edge patterns embedded in the test image and are contained in the test image signal components of the test image signal representing the test image.

In the first signal correcting method for use in a radiation image read-out apparatus in accordance with the present invention, in each of the line sensor constituting units, the photoelectric conversion devices constituting the line sensor constituting unit may be arrayed only over a range shorter than the entire length of the line sensor constituting unit. In cases where such line sensor constituting units are employed, the line sensor constituting units may be arrayed such that the certain regions of the effective sensor ranges of the adjacent line sensor constituting units, in which effective sensor ranges the photoelectric conversion devices are arrayed, overlap each other.

The present invention also provides a second signal correcting method for use in a radiation image read-out apparatus, wherein position matching processing is performed on radiation image signal components of a radiation image signal representing a radiation image, which radiation image signal components have been obtained from a plurality of line sensors in the radiation image read-out apparatus comprising:

i) a line light source for linearly irradiating stimulating rays onto an area of one surface of a stimulable phosphor sheet, on which the radiation image has been stored, the stimulating rays causing the stimulable phosphor sheet to emit light in proportion to an amount of energy stored thereon during its exposure to radiation, ii) the plurality of the line sensors for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, each of the line sensors comprising a plurality of photoelectric conversion devices arrayed along a length direction of the linear area of the stimulable phosphor sheet, iii) scanning means for moving the stimulable phosphor sheet with respect to the line light source and the plurality of the line sensors and in a direction different from the length direction of the linear area of the stimulable phosphor sheet, and iv) reading means for successively reading outputs of the plurality of the line sensors in accordance with the movement in order to obtain the radiation image signal, which represents the radiation image, the method comprising the steps of:

a) reading out a test image, in which edge patterns extending in a direction different from the length direction of the linear area of the stimulable phosphor sheet are embedded, test image signal components of a test image signal, which represents the test image, being thereby acquired from each of the line sensors, and b) performing the position matching processing on the lie radiation image signal components of the radiation image signal representing the radiation image, which radiation image signal components have been obtained from the plurality of the line sensors, and in accordance with edge pattern signal components, which represent the edge patterns embedded in the test image and are contained in the test image signal components of the test image signal representing the test image.

In the second signal correcting method for use in a radiation image read-out apparatus in accordance with the present invention, in each of the line sensors, the photoelectric conversion devices constituting the line sensor may be arrayed only over a range shorter than the entire length of the line sensor. By way of example, in cases where a plurality of line sensor constituting units, each of which comprises the photoelectric conversion devices arrayed only over a range shorter than the entire length of the line sensor constituting unit, are formed, and each of the line sensors is formed by arraying the plurality of the line sensor constituting units along the length direction of each line sensor, the effective sensor ranges occur intermittently along the length direction of each line sensor. Therefore, in cases where such line sensors are employed, the line sensors may be arrayed such that the certain regions of the effective sensor ranges of the adjacent line sensors, in which effective sensor ranges the photoelectric conversion devices are arrayed, overlap each other.

In the first and second signal correcting methods for use in a radiation image read-out apparatus in accordance with the present invention, the line light source may be one of various light sources, which linearly irradiate the stimulating rays onto the surface of the stimulable phosphor sheet. As the line light source, for example, an LED array, an organic electroluminescence (EL) device, a fluorescent lamp, a high-pressure sodium lamp, a cold cathode tube, or the like, may be employed. The line light source is not limited to a light source for producing the stimulating rays, which already takes on the form of the linear stimulating rays, and may be provided with an expanding mechanism for expanding the stimulating rays, which have been produced by the line light source, such that the linear stimulating rays may impinge upon the surface of the stimulable phosphor sheet. Also, a broad area laser (BLD), which radiates the linear stimulating rays, may be employed as the line light source.

The stimulating rays may be radiated continuously out of the line light source or may be pulsed stimulating rays radiated intermittently out of the line light source. From the point of view of reducing noise, the stimulating rays should preferably be the pulsed stimulating rays having high intensity. Also, the stimulating rays may have wavelengths falling within the stimulation wavelength range for the stimulable phosphor sheet. For example, in cases where the stimulable phosphor sheet is capable of being stimulated by red stimulating rays, the stimulating rays may have wavelengths falling within the range of 600 nm to 1,000 nm, and should preferably have wavelengths falling within the range of 600 nm to 700 nm.

The length of the irradiation region of the stimulating rays, which have been radiated out of the line light source, on the stimulable phosphor sheet, the length being taken along the major axis direction, should preferably be equal to or longer than the length of one side of the stimulable phosphor sheet. In such cases, the stimulating rays may be irradiated from an oblique angle with respect to the side of the stimulable phosphor sheet.

In order for the degree of convergence of the stimulating rays, which have been radiated out of the line light source, on the stimulable phosphor sheet to be enhanced, a cylindrical lens, a slit, a distributed index lens array, such as a SELFOC lens array or a rod lens array, an optical fiber bundle, or the like, or a combination of two or more of the above-enumerated elements may be located between the line light source and the stimulable phosphor sheet. The beam width of the stimulating rays, which have been radiated out of the line light source, on the stimulable phosphor sheet should preferably fall within the range of 10 μm to 4,000 μm.

In order for the degree of convergence of the light, which is emitted from respective areas of the stimulable phosphor sheet, on the line sensor to be enhanced, a distributed index lens array, such as a SELFOC lens array or a rod lens array, constituted of an image forming system in which an object surface and an image surface correspond to each other in one-to-one relationship, a cylindrical lens, a slit, an optical fiber bundle, or the like, or a combination of two or more of the above-enumerated elements should preferably be located between the stimulable phosphor sheet and the line sensor.

As will be understood from the specification, it should be noted that the term "moving a stimulable phosphor sheet with respect to a line light source and a line sensor" as used herein means movement of the stimulable phosphor sheet relative to the line light source and the line sensor, and embraces the cases wherein the stimulable phosphor sheet is moved while the line light source and the line sensor are kept stationary, the cases wherein the line light source and the line sensor are moved while the stimulable phosphor sheet is kept stationary, and the cases wherein both the stimulable phosphor sheet and the line light source and the line sensor are moved. In cases where the line light source and the line sensor are moved, they should be moved together with each other.

The direction along which the stimulable phosphor sheet is moved with respect to the line light source and the line sensor (i.e., the direction different from the length direction of the exposed linear area of the stimulable phosphor sheet) should preferably be the direction approximately normal to the length direction of the exposed linear area of the stimulable phosphor sheet (i.e., approximately normal to the major axis direction of the line light source and the line sensor) i.e. should preferably be the minor axis direction of the line light source and the line sensor. However, the direction, along which the stimulable phosphor sheet is moved with respect to the line light source and the line sensor, is not limited to the minor axis direction. For example, in cases where the lengths of the line light source and the line sensor are longer than one side of the stimulable phosphor sheet as described above, the stimulable phosphor sheet may be moved with respect to the line light source and the line sensor along an oblique direction with respect to the direction approximately normal to the length direction of the line light source and the line sensor or along a zigzag movement direction, such that approximately the entire surface of the stimulable phosphor sheet may be uniformly exposed to the stimulating rays.

A stimulating ray cut-off filter (a sharp cut-off filter or a band-pass filter) for transmitting only the light emitted by the stimulable phosphor sheet and filtering out the stimulating rays should preferably be located in the optical path of the emitted light between the stimulable phosphor sheet and the line sensor. In this manner, the stimulating rays should preferably be prevented from impinging upon the line sensor.

As the line sensor or the line sensor constituting unit, an amorphous silicon sensor, a charge coupled device (CCD) image sensor, a CCD image sensor with back illuminator, a metal oxide semiconductor (MOS) image sensor, or the like, may be employed.

The number of the photoelectric conversion devices arrayed along the length direction of the line sensor should a preferably be at least 1,000. The length of the line sensor, as measured at the light receiving surface of the line sensor, should preferably be longer than or equal to the length of one side of the stimulable phosphor sheet. In cases where the length of the line sensor is longer than the length of one side of the stimulable phosphor sheet, the line sensor may be located obliquely with respect to the side of the stimulable phosphor sheet and may thereby perform the photoelectric detection of the emitted light.

Also, the line sensor may comprise the plurality of the line sensor constituting units arrayed such that only the photoelectric conversion device, which is located at an end of a line sensor constituting unit, overlaps the photoelectric conversion device, which is located at an end of the adjacent line sensor constituting unit. Alternatively, the line sensor may comprise the plurality of the line sensor constituting units arrayed in a zigzag pattern with respect to the minor axis direction such that all of the photoelectric conversion devices, which constitute a line sensor constituting unit, overlap the photoelectric conversion devices, which constitute the adjacent line sensor constituting unit. As another alternative, at least three line sensors may be arrayed with respect to the minor axis direction.

In cases where the line sensor is constituted of a large number of photoelectric conversion devices and there is the risk that adverse effects will occur with respect to a transfer rate, memory devices corresponding to the respective photoelectric conversion devices may be utilized, and an electric charge having been accumulated in each of the photoelectric conversion devices during a charge accumulation period may be stored in the corresponding memory device. In the next charge accumulation period, the electric charge may be read from each memory device. In this manner, the charge accumulation time may be prevented from becoming short due to an increase in the charge transfer time.

In each of the radiation image read-out apparatuses, in which the first and second signal correcting methods are employed, the line light source and the line sensor may be located on the same surface side of the stimulable phosphor sheet or on opposite surface sides of the stimulable phosphor sheet. In cases where the line light source and the line sensor are located on opposite surface sides of the stimulable phosphor sheet, the substrate of the stimulable phosphor sheet, or the like, should be formed from a material permeable to the emitted light, such that the emitted light may permeate to the surface side of the stimulable phosphor sheet opposite to the surface on the stimulating ray incidence side.

The stimulating rays irradiated to the stimulable phosphor sheet should preferably be set such that the power (corresponding to the irradiation intensity or the luminance) of the stimulating rays may not vary. In cases where variation in power of the stimulating rays occurs, the intensity of the stimulating rays may be monitored with monitoring means. When variation in power occurs, for example, the driving voltage for the line light source, or the like, may be modulated with the modulating means more quickly than the photoelectric conversion speed of the photoelectric conversion devices such that the emission power (the luminance) of the line light source may become equal to a predetermined value. In this manner, adverse effects of power variation may be suppressed.

As the edge patterns embedded in the test image, various patterns extending in the minor axis direction different from the length direction of the linear area of the stimulable phosphor sheet may be employed. For example, the edge patterns may be line-like image patterns extending in the minor axis direction.

The test image may be formed on the stimulable phosphor sheet or an anti-Stokes' type of stimulable phosphor sheet (the stimulable phosphor sheet and the anti-Stokes' type of the stimulable phosphor sheet will hereinbelow be referred to as the stimulable phosphor sheet, or the like) with a technique, wherein the test image is drawn on the surface of the stimulable phosphor sheet, or the like, by use of a material capable of absorbing the radiation, a material capable of absorbing the stimulating rays, or a material capable of absorbing the light emitted by the stimulable phosphor sheet, or the like. Alternatively, the test image may be formed on the stimulable phosphor sheet, or the like, with a technique, wherein concave patterns are formed on the surface of the stimulable phosphor sheet, or the like, in accordance with the test image. As the material capable of absorbing the radiation, a metal foil constituted of lead, or the like, may be employed. In such cases, the metal foil may be cut into thin pieces, and the test image may be drawn with the thin pieces of the metal foil. As the material capable of absorbing the stimulating rays or the light emitted by the stimulable phosphor sheet, or the like, a dye or a pigment, which is capable of absorbing the stimulating rays or the emitted light, may be employed. In such cases, the test image may be drawn with a coating composition, which contains the dye or the pigment described above.

The term "anti-Stokes' type of stimulable phosphor sheet" as used herein means the stimulable phosphor sheet containing a phosphor, which need not be exposed previously to radiation and is capable of emitting light when being exposed to the stimulating rays.

Also, the test image signal may be obtained from an operation, wherein the test image is read out from a stimulable phosphor sheet, on which the test image has been stored. Alternatively, the test image signal may be obtained from an operation, in which a reference light source capable of radiating out light representing the test image is utilized, the light representing the test image is radiated out from the reference light source, and the light representing the test image is detected.

Further, each of the first and second signal correcting methods for use in a radiation image read-out apparatus in accordance with the present invention may be modified such that the stimulable phosphor sheet, on which the radiation image has been stored, is provided with a region, in which the test image has been formed, the radiation image and the test image are read out from the stimulable phosphor sheet, and the radiation image signal and the test image signal are thereby obtained simultaneously.

With the first signal correcting method for use in a radiation image read-out apparatus in accordance with the present invention, the test image, in which the edge patterns are embedded at the positions corresponding to the overlapping regions of the line sensor constituting units, is read out, and the test image signal components of the test image signal, which represents the test image, are thereby acquired from each of the line sensor constituting units. The test image signal components of the test image signal representing the test image, which test image signal components have been acquired from the line sensor constituting units, contain the edge pattern signal components, which represent the edge patterns embedded in the test image. Therefore, the positions of the radiation image signal components of the radiation image signal representing the radiation image, which radiation image signal components have been obtained from the line sensor constituting units adjacent to each other, are matched with each other, such that the positions of the edge pattern signal components, which are contained in the test image signal components having been acquired from the line sensor constituting units adjacent to each other, coincide with each other. In this manner, the position matching processing is capable of being performed on the radiation image signal components of the radiation image signal representing the radiation image, which radiation image signal components have been obtained from the plurality of the line sensor constituting units. Accordingly, a shift is capable of being prevented from occurring between the radiation image patterns, which are obtained from the respective line sensor constituting units, and a radiation image having good image quality is capable of being obtained.

With the second signal correcting method for use in a radiation image read-out apparatus in accordance with the present invention, the test image, in which the edge patterns are embedded, is read out, and the test image signal components of the test image signal, which represents the test image, are thereby acquired from each of the line sensors. The test image signal components of the test image signal representing the test image, which test image signal components have been acquired from the line sensors, contain the edge pattern signal components, which represent the edge patterns embedded in the test image. Therefore, the positions of the radiation image signal components of the radiation image signal representing the radiation image, which radiation image signal components have been obtained from the line sensors adjacent to each other, are matched with each other, such that the positions of the edge pattern signal components, which are contained in the test image signal components having been acquired from the line sensors adjacent to each other, coincide with each other. In this manner, the position matching processing is capable of being performed on the radiation image signal components of the radiation image signal representing the radiation image, which radiation image signal components have been obtained from the plurality of the line sensors. Accordingly, a shift is capable of being prevented from occurring between the radiation image patterns, which are obtained from the respective line sensors, and a radiation image having good image quality is capable of being obtained.

With each of the first and second signal correcting methods for use in a radiation image read-out apparatus in accordance with the present invention, wherein the stimulable phosphor sheet, on which the radiation image has been stored, is provided with the region, in which the test image has been formed, both the radiation image and the test image are capable of being read out simultaneously from the stimulable phosphor sheet. Therefore, in such cases, the position matching processing is capable of being performed, while the radiation image signal representing the radiation image is being obtained.

DESCRIPTION OF THE PREFERRED EMBODIMENTS

The present invention will hereinbelow be described in further detail with reference to the accompanying drawings.

Figure 1A:
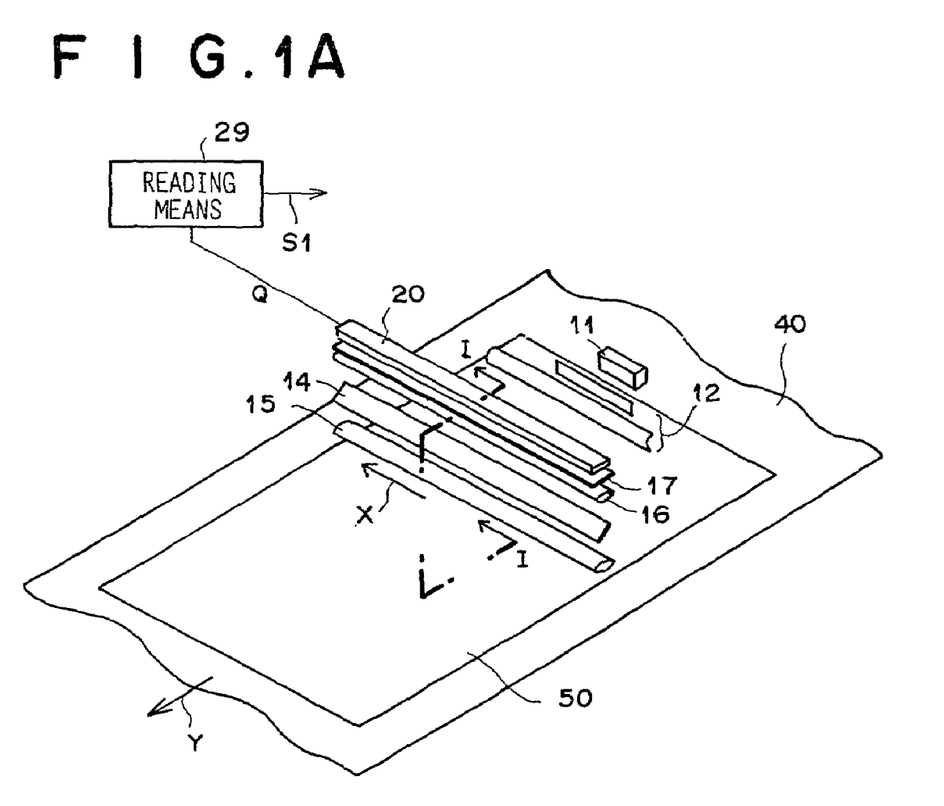
FIG. 1A is a perspective view showing a radiation image read-out apparatus, in which an embodiment of the signal correcting method in accordance with the present invention is employed.
Figure 1B:
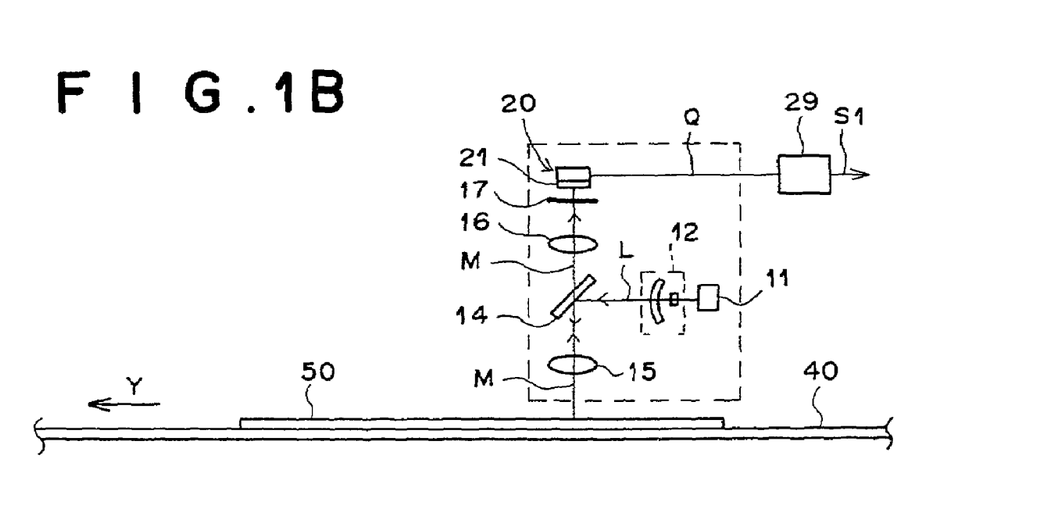
FIG. 1B is a sectional view taken on line I—I of FIG. 1A.
Figure 2:
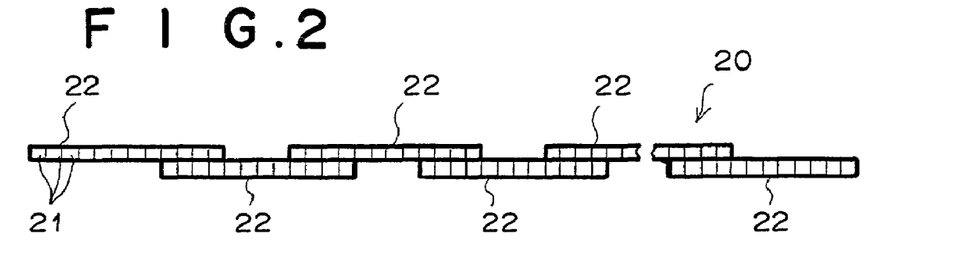
FIG. 2 is an explanatory view showing a line sensor in the radiation image read-out apparatus of FIG. 1A.

FIG. 1A is a perspective view showing a radiation image read-out apparatus, in which an embodiment of the signal correcting method in accordance with the present invention is employed. FIG. 1B is a sectional view taken on line I—I of FIG. 1A. FIG. 2 is an explanatory view showing a line sensor in the radiation image read-out apparatus of FIG. 1A.

With reference to FIGS. 1A and 1B, the radiation image read-out apparatus comprises a scanning belt 40 for supporting a stimulable phosphor sheet (hereinbelow referred to simply as the sheet) 50, on which a radiation image has been stored. The scanning belt 40 conveys the sheet 50 in the direction indicated by the arrow Y. The radiation image read-out apparatus also comprises a broad area laser (hereinbelow referred to as the BLD) 11 for radiating out secondary stimulating rays (hereinbelow referred to simply as the stimulating rays) L having a linear pattern with a line width of approximately 100 µm. The stimulating rays L are radiated out approximately in parallel with the surface of the sheet 50. The radiation image read-out apparatus further comprises an optical system 12, which is constituted of a combination of a collimator lens for collimating the linear stimulating rays L having been radiated out of the BLD 11 and a toric lens for expanding the beam only in one direction. The radiation image read-out apparatus still further comprises a dichroic mirror 14, which is located at an angle of 45 degrees with respect to the surface of the sheet 50 and which is set so as to reflect the stimulating rays L and to transmit emitted light M described later. The radiation image read-out apparatus also comprises a distributed index lens array (constituted of an array of a plurality of distributed index lenses and hereinbelow referred to as the first SELFOC lens array) 15. The first SELFOC lens array 15 converges the linear stimulating rays L, which have been reflected from the dichroic mirror 14, into a linear beam (line width: approximately 100 µm) extending along the direction indicated by the arrow X on the sheet 50. Also, the first SELFOC lens array 15 collimates the light M, which is emitted by the sheet 50 exposed to the linear stimulating rays L and which carries the radiation image information having been stored on the sheet 50. The radiation image read-out apparatus further comprises a second SELFOC lens array 16 for converging the emitted light M, which has been collimated by the first SELFOC lens array 15 and has then passed through the dichroic mirror 14, onto light receiving surfaces of photoelectric conversion devices 21, 21, . . . constituting a line sensor 20, which will be described later. The radiation image read-out apparatus still further comprises a stimulating ray cut-off filter 17 for transmitting only the emitted light M and filtering out the stimulating rays L, which have been reflected from the surface of the sheet 50 and which are mixed slightly in the emitted light M having passed through the second SELFOC lens array 16. The radiation image read-out apparatus also comprises the line sensor 20, which is constituted of a plurality of the photoelectric conversion devices 21, 21, . . . for receiving the emitted light M having passed through the stimulating ray cut-off filter 17 and for photoelectrically converting the emitted light M. The radiation image read-out apparatus further comprises reading means 29 for successively reading radiation image signal components, which have been fed out from the photoelectric conversion devices 21, 21, . . . constituting the line sensor 20, in accordance with the movement of the sheet 50 in order to obtain a radiation image signal S1 representing the radiation image having been stored on the sheet 50.

The first SELFOC lens array 15 acts such that an image of the emission area of the emitted light M on the sheet 50 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surfaces of the photoelectric conversion devices 21, 21, . . .

The optical system 12, which is constituted of the collimator lens and the toric lens, expands the stimulating rays L, which come from the BLD 11, into a desired irradiation area on the dichroic mirror 14.

As illustrated in FIG. 2, the line sensor 20 comprises a plurality of line sensor constituting units 22, 22, . . . , each of which comprises a plurality of the photoelectric conversion devices 21, 21, . . . arrayed in a row along a major axis direction (i.e., the direction indicated by the arrow X in FIG. 1A). The plurality of the line sensor constituting units 22, 22, . . . are arrayed along the major axis direction such that certain regions of adjacent line sensor constituting units overlap each other. Each of the photoelectric conversion devices 21, 21, . . . has the light receiving surface having a size of approximately 100 μm×100 μm. The size of each light receiving surface is the size capable of receiving the emitted light M occurring from part having a size of approximately 100 μm×100 μm on the surface of the sheet 50. As the photoelectric conversion devices 21, 21, . . . , amorphous silicon sensors, CCD image sensors, MOS image sensors, or the like, may be employed.

How the radiation image read-out apparatus of FIG. 1A operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y.

The BLD 11 radiates out the stimulating rays L having a linear pattern. The stimulating rays L are radiated out approximately in parallel with the surface of the sheet 50. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the surface of the sheet 50. The reflected stimulating rays L are converged by the first SELFOC lens array 15 into a linear beam extending along the direction indicated by the arrow X on the sheet 50.

The linear stimulating rays L impinging upon the sheet 50 stimulate the stimulable phosphor at the exposed area. The stimulating rays L also enter into the sheet 50 from the exposed area, are scattered to the areas neighboring with the exposed area, and stimulate the stimulable phosphor at the neighboring areas. In this manner, the stimulable phosphor at the area containing the exposed area and the neighboring areas is stimulated. As a result, the light M carrying the image information stored on the sheet 50 is emitted from the area containing the exposed area and the neighboring areas.

The light M emitted from the area of the sheet 50 is collimated by the first SELFOC lens array 15, passes through the dichroic mirror 14, and is converged by the second SELFOC lens array 16 onto each of the light receiving surfaces of the photoelectric conversion devices 21, 21, . . . constituting the line sensor 20. At this time, the stimulating rays L, which have been reflected from the surface of the sheet 50 and are mixed slightly in the emitted light M having passed through the second SELFOC lens array 16, are filtered out by the stimulating ray cut-off filter 17.

The line sensor 20 photoelectrically converts the emitted light M, which has been received by each of the photoelectric conversion devices 21, 21, . . . , and obtains radiation image signal components Q, Q, . . . from the photoelectric conversion devices 21, 21, . . . The radiation image signal components Q, Q, . . . are fed into the reading means 29.

The reading means 29 performs analog-to-digital conversion on the received radiation image signal components Q, Q, . . . Also, the reading means 29 stores the radiation image signal components Q, Q, . . . , which have been obtained from the analog-to-digital conversion, such that it is clear which radiation image signal component Q corresponds to which site on the sheet 50. When the radiation image signal components Q, Q, . . . have thus been obtained with respect to the entire surface of the sheet 50, the reading means 29 feeds out the radiation image signal S1, which is made up of the series of the radiation image signal components Q, Q, . . . and represents the radiation image having been stored on the sheet 50.

Figure 3:
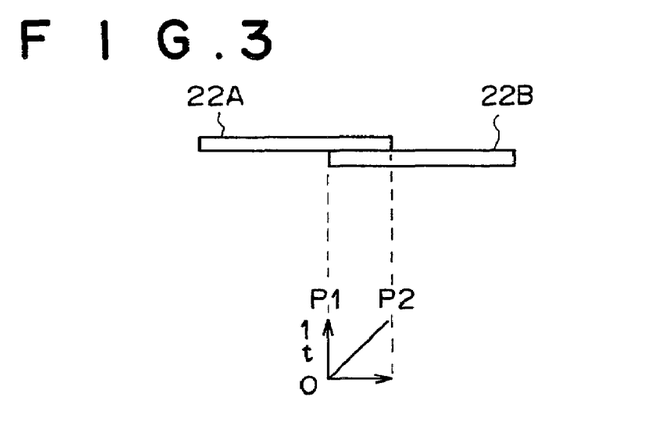
FIG. 3 is an explanatory view showing how radiation image signal components of a radiation image signal representing a radiation image, which radiation image signal components correspond to an overlapping region of line sensor constituting units adjacent to each other, are calculated.

In such cases, with respect to the overlapping regions of the line sensor constituting units 22, 22, which are adjacent to each other in the line sensor 20, the radiation image signal component Q, which has been obtained from the photoelectric conversion device 21 located within the overlapping region of one of the two adjacent line sensor constituting units 22, 22, and the radiation image signal component Q, which has been obtained from the photoelectric conversion device 21 located within the overlapping region of the other line sensor constituting units 22, overlap each other. Therefore, with respect to the overlapping regions of the line sensor constituting units 22, 22, . . . , a mean value of the radiation image signal components Q, Q, which overlap each other, is calculated, and the thus calculated mean value is taken as the radiation image signal component corresponding to the overlapping regions. Alternatively, the radiation image signal components corresponding to the overlapping regions may be calculated by performing linear interpolating operations on the radiation image signal components having been obtained from the line sensor constituting units 22, 22, . . . For example, as illustrated in FIG. 3, in cases where certain regions of a first line sensor constituting unit 22A and a second line sensor constituting unit 22B overlap each other, a radiation image signal component Q1 may be obtained from the first line sensor constituting unit 22A, and a radiation image signal component Q2 may be obtained from the second line sensor constituting unit 22B. In such cases, radiation image signal components QC corresponding to the overlapping regions may be calculated with Formula (1) shown below.

$$QC = Q1 \cdot (1-t) + Q2 \cdot t \quad (1)$$

wherein t represents a weight factor, which changes linearly such that the weight factor takes a value of 0 with respect to a position P1 and takes a value of 1 with respect to a position P2. As another alternative, the radiation image signal components corresponding to the overlapping regions may be calculated with interpolating operations of a high order.

In order for the radiation image signal components corresponding to the overlapping regions to be calculated in the manner described above, position matching processing should be performed on the radiation image signal components, which have been obtained from the overlapping regions of the line sensor constituting units 22, 22, . . . If the position matching processing is not performed, a shift will occur between the radiation image patterns, which are obtained from the line sensor constituting units 22, 22, . . . Therefore, in the embodiment of the signal correcting method for use in a radiation image read-out apparatus in accordance with the present invention, the position matching processing is performed in the manner described below.

Figure 4:
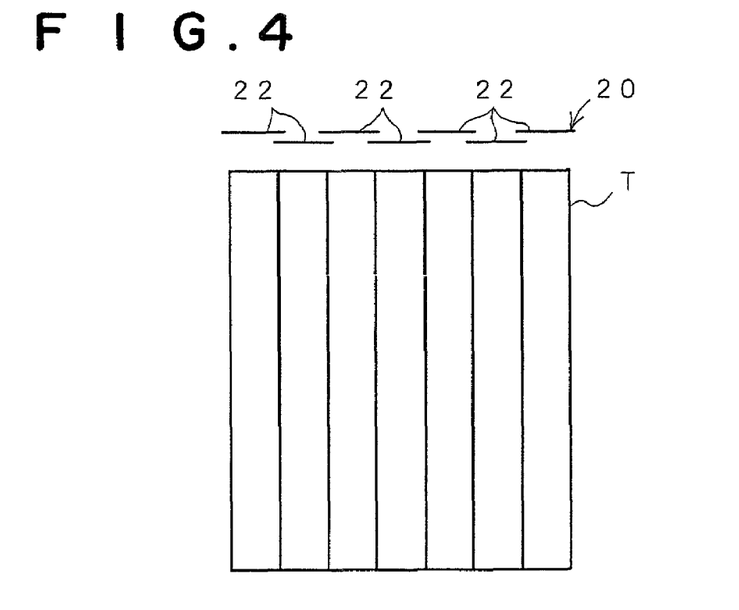
FIG. 4 is an explanatory view showing a test image.
Figure 5:
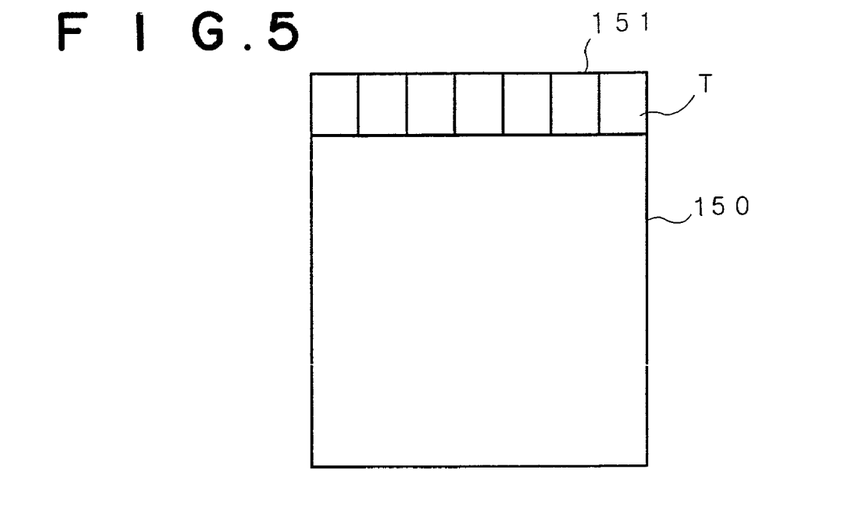
FIG. 5 is an explanatory view showing a stimulable phosphor sheet provided with a region, in which a test image has been formed.

Specifically, firstly, as illustrated in FIG. 4, a test image T, in which line patterns are embedded at positions corresponding to the overlapping regions of the line sensor constituting units 22, 22, . . . , is prepared. Also, the test image T is read out with the line sensor 20. The test image T may be prepared by drawing the line patterns on the surface of a stimulable phosphor sheet, which may be of the same type as the sheet 50, by use of a material capable of absorbing the radiation, a material capable of absorbing the stimulating rays L, or a material capable of absorbing the light M emitted by the stimulable phosphor sheet. Alternatively, the test image T may be formed on the stimulable phosphor sheet, which may be of the same type as the sheet 50, with a technique, wherein concave patterns are formed on the surface of the stimulable phosphor sheet in accordance with the test image T. As another alternative, in lieu of the stimulable phosphor sheet described above, an anti-Stokes' type of stimulable phosphor sheet may be employed for the formation of the test image T. As a further alternative, a reference light source, which is capable of radiating out light carrying image information of the test image T, may be utilized, the light radiated out from the reference light source may be detected with the line sensor 20, and the test image T may thereby be read out. As a still further alternative, as illustrated in FIG. 5, a stimulable phosphor sheet 150 provided with a non-storable region 151, in which the radiation image cannot be stored, may be utilized, and the test image T may be drawn in the non-storable region 151. In cases where the radiation image is stored on the stimulable phosphor sheet 150 provided with the non-storable region 151, the operation for reading out the radiation image and the operation for reading out the test image T are capable of being performed simultaneously.

Figure 6A:
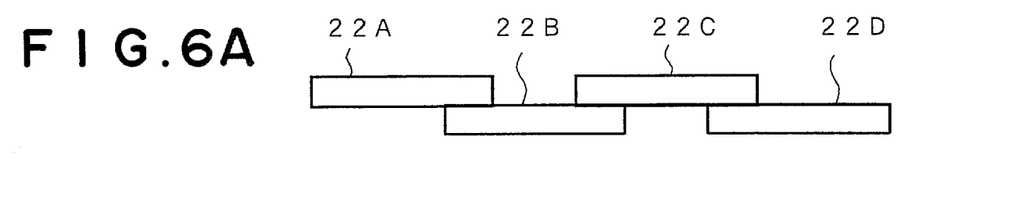
FIGS. 6A and 6B are explanatory views showing how position matching processing is performed on radiation image signal components of the radiation image signal representing the radiation image, which radiation image signal components have been obtained from a plurality of line sensor constituting units.
Figure 6B:
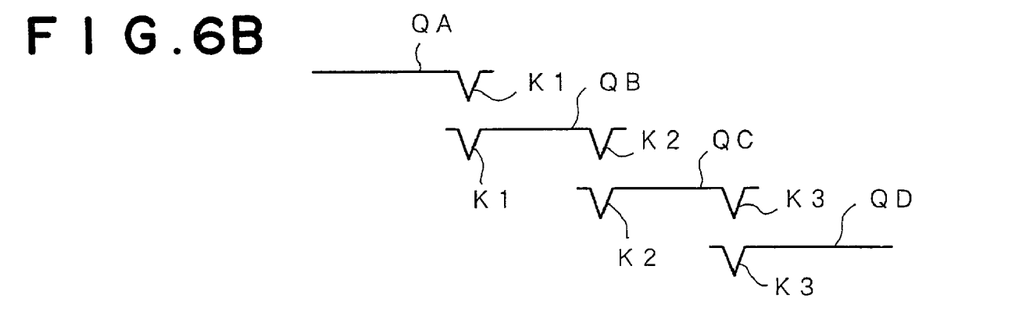

After the test image T has been read out, the position matching processing is performed on the radiation image signal components of the radiation image signal representing the radiation image, which radiation image signal components have been obtained from the line sensor constituting units 22, 22, . . . , in the manner described below. FIGS. 6A and 6B are explanatory views showing how the position matching processing is performed on the radiation image signal components of the radiation image signal representing the radiation image, which radiation image signal components have been obtained from the line sensor constituting units 22, 22, . . . As an aid in facilitating the explanation, as illustrated in FIG. 6A, it is assumed that the line sensor 20 comprises four line sensor constituting units 22A, 22B, 22C, and 22D. When the test image T is read out with the line sensor 20 comprising the four line sensor constituting units 22A, 22B, 22C, and 22D, as illustrated in FIG. 6B, test image signal components QA, test image signal components QB, test image signal components QC, and test image signal components QD are obtained respectively from the line sensor constituting units 22A, 22B, 22C, and 22D. As illustrated in FIG. 6B, the test image signal components QA have a peak K1 with a small signal value at the position corresponding to the line pattern embedded in the test image T. The test image signal components QB have peaks K1 and K2 with a small signal value at the positions corresponding to the line patterns embedded in the test image T. The test image signal components QC have peaks K2 and K3 with a small signal value at the positions corresponding to the line patterns embedded in the test image T. Also, the test image signal components QD have a peak K3 with a small signal value at the position corresponding to the line pattern embedded in the test image T.

Therefore, the positions of the radiation image signal components of the radiation image signal representing the radiation image, which radiation image signal components have been obtained from the line sensor constituting units adjacent to each other, are matched with each other, such that the positions of the corresponding peaks K1, K1 coincide with each other, such that the positions of the corresponding peaks K2, K2 coincide with each other, and such that the positions of the corresponding peaks K3, K3 coincide with each other. In this manner, the position matching processing is capable of being performed on the radiation image signal components of the radiation image signal representing the radiation image, which radiation image signal components have been obtained from the line sensor constituting units 22A, 22B, 22C, and 22D. Specifically, addresses of the radiation image signal components of the radiation image signal representing the radiation image, which radiation image signal components have been obtained from the photoelectric conversion devices 21, 21, . . . of the line sensor constituting units 22A, 22B, 22C, and 22D, are matched with one another, such that the position of the peak K1 of the test image signal components QA coincides with the position of the peak K1 of the test image signal components QB, such that the position of the peak K2 of the test image signal components QB coincides with the position of the peak K2 of the test image signal components QC, and such that the position of the peak K3 of the test image signal components QC coincides with the position of the peak K3 of the test image signal components QD. In this manner, the position matching processing is performed on the radiation image signal components of the radiation image signal representing the radiation image.

In the manner described above, the test image T illustrated in FIG. 4 is read out with the line sensor 20. Also, the positions of the radiation image signal components of the radiation image signal representing the radiation image, which radiation image signal components have been obtained from the line sensor constituting units adjacent to each other, are matched with each other, such that the positions of the peaks of the test image signal components having been acquired from the line sensor constituting units adjacent to each other, coincide with each other. In this manner, the position matching processing is capable of being performed on the radiation image signal components of the radiation image signal representing the radiation image, which radiation image signal components have been obtained from the plurality of the line sensor constituting units 22, 22, . . . Accordingly, a shift is capable of being prevented from occurring between the radiation image patterns, which are obtained from the respective line sensor constituting units 22, 22, . . . , and the radiation image signal S1, which represents a radiation image having good image quality, is capable of being obtained.

Figure 7:
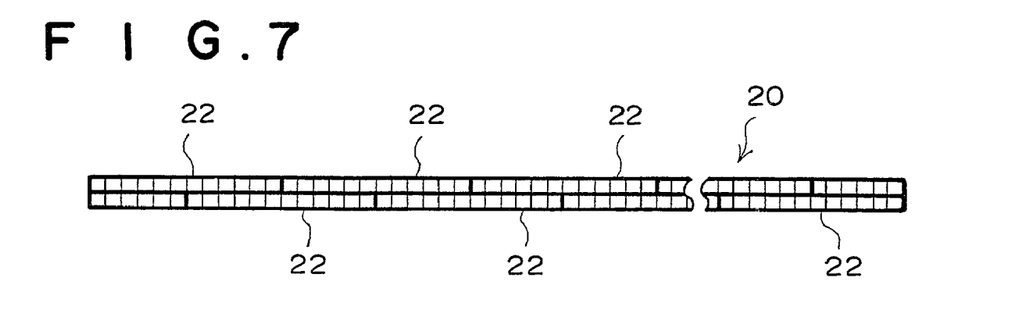
FIG. 7 is an explanatory view showing a different example of a line sensor.

In the embodiment described above, as illustrated in FIG. 2, the line sensor 20, which comprises the plurality of the line sensor constituting units 22, 22, . . . arrayed such that the certain regions of the adjacent line sensor constituting units overlap each other, is employed. Alternatively, as illustrated in FIG. 7, a line sensor 20 may be employed, which comprises the plurality of the line sensor constituting unit 22, 22, . . . arrayed such that the entire regions of the line sensor constituting units overlap each other. In such cases, the mean value of the radiation image signal components Q, Q, which overlap each other and correspond to the overlapping regions of the line sensor constituting units 22, 22, may be calculated, and the thus calculated mean value may be taken as each of the radiation image signal components corresponding to overlapping regions.

Figure 8:
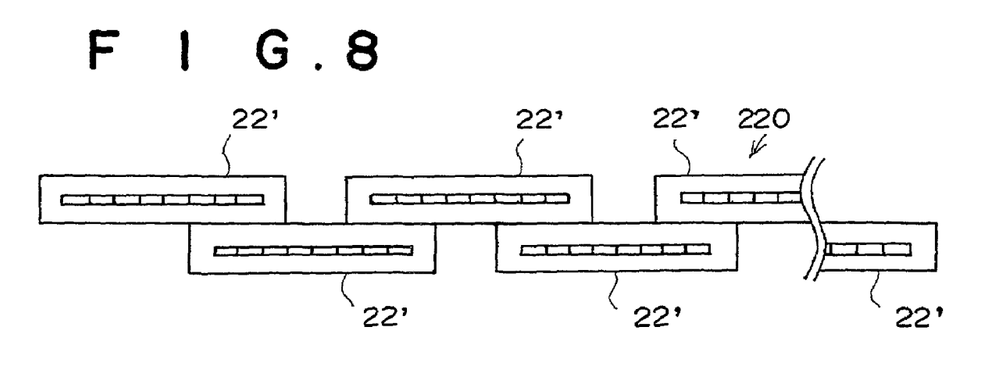
FIG. 8 is an explanatory view showing a further different example of a line sensor.

As another alternative, as illustrated in FIG. 8, in each of line sensor constituting units 22', 22', . . . , the photoelectric conversion devices 21, 21, . . . constituting the line sensor constituting unit 22' may be arrayed only over a range shorter than the entire length of the line sensor constituting unit 22'. In such cases, a line sensor 220 is formed by arraying the line sensor constituting units 22', 22', . . . such that the certain regions of the effective sensor ranges of the adjacent line sensor constituting units 22', 22', in which effective sensor ranges the photoelectric conversion devices 21, 21, . . . are arrayed, overlap each other.

In the radiation image read-out apparatus of FIG. 1A, part of the optical path of the stimulating rays L and part of the optical path of the emitted light M overlap each other, and the size of the apparatus is thereby reduced. Alternatively, for example, as illustrated in FIG. 9, the radiation image read-out apparatus may be constituted such that the optical path of the stimulating rays L and the optical path of the emitted light M may not overlap each other.

Figure 9:
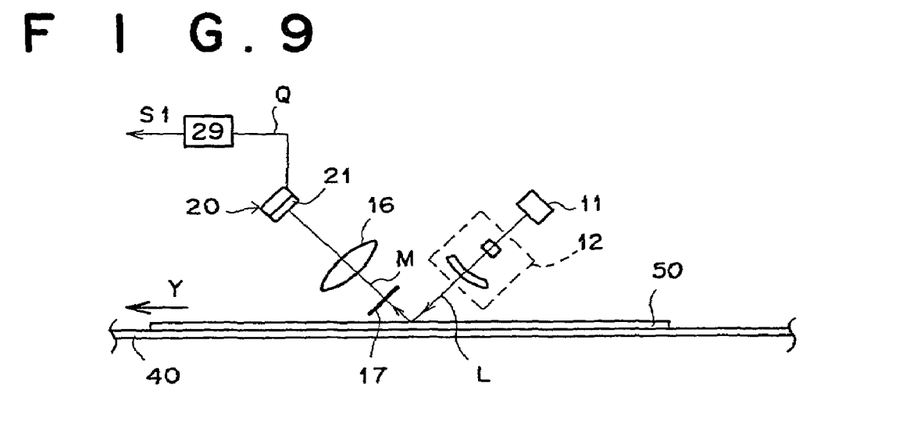
FIG. 9 is a sectional view showing a different example of a radiation image read-out apparatus, in which the embodiment of the signal correcting method in accordance with the present invention is employed.

Specifically, the radiation image read-out apparatus illustrated in FIG. 9 comprises the scanning belt 40 and the BLD 11 for radiating out the linear stimulating rays L at an angle of approximately 45 degrees with respect to the surface of the sheet 50. The radiation image read-out apparatus also comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the surface of the sheet 50. The radiation image read-out apparatus further comprises the SELFOC lens array 16 having an optical axis, which is inclined at an angle of approximately 45 degrees with respect to the surface of the sheet 50 and which is approximately normal to the direction of travel of the stimulating rays L. The SELFOC lens array 16 converges the light M, which is emitted by the sheet 50 when the sheet 50 is exposed to the stimulating rays L, onto the light receiving surfaces of the photoelectric conversion devices 21, 21, . . . constituting the line sensor 20. The radiation image read-out apparatus still further comprises the stimulating ray cut-off filter 17 for transmitting only the emitted light M and filtering out the stimulating rays L, which are mixed slightly in the emitted light M impinging upon the SELFOC lens array 16. The radiation image read-out apparatus also comprises the line sensor 20, which is constituted of a plurality of the photoelectric conversion devices 21, 21, . . . for receiving the emitted light M having passed through the stimulating ray cut-off filter 17 and for photoelectrically converting the emitted light M. The radiation image read-out apparatus further comprises the reading means 29 for successively reading the radiation image signal components Q, Q, . . . , which have been fed out from the photoelectric conversion devices 21, 21, . . . constituting the line sensor 20, in order to obtain the radiation image signal S1 representing the radiation image having been stored on the sheet 50.

Figure 10:
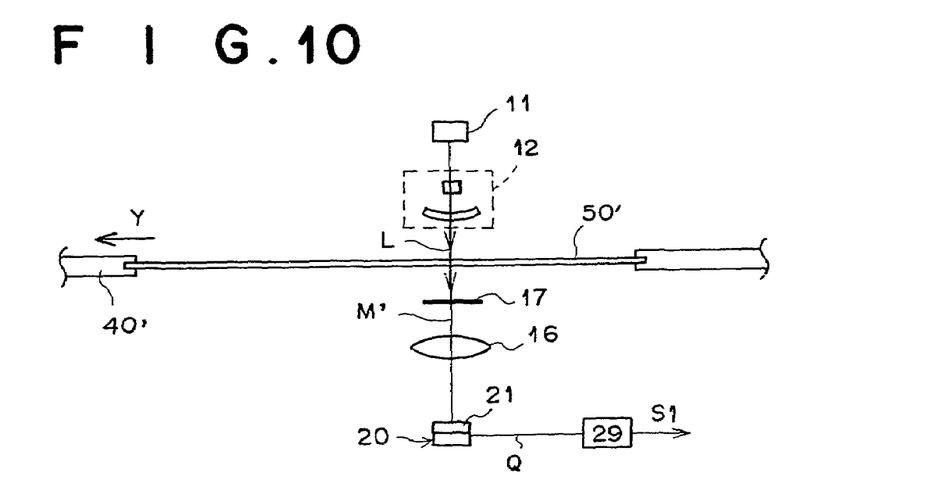
FIG. 10 is a sectional view showing a further different example of a radiation image read-out apparatus, in which the embodiment of the signal correcting method in accordance with the present invention is employed.

In the aforesaid radiation image read-out apparatuses of FIG. 1A and FIG. 9, the BLD 11 for producing the stimulating rays L and the line sensor 20 are located on the same surface side of the sheet 50, and the emitted light M emanating from the surface of the sheet 50, upon which the stimulating rays L impinge, is received by the line sensor 20. Thus the constitutions are the reflection types of constitutions. However, the radiation image read-out apparatus, in which the signal correcting method in accordance with the present invention is employed, is not limited to the reflection types of constitutions. For example, as illustrated in FIG. 10, a stimulable phosphor sheet 50' whose substrate is formed from a material permeable to the emitted light M may be employed, and the BLD 11 for producing the stimulating rays L and the line sensor 20 may be located on opposite surface sides of the sheet 50'. In this manner, the emitted light M emanating from the surface opposite to the surface of the sheet 50', upon which the stimulating rays L impinge, may be received by the line sensor 20. Thus the constitution may be the transmission type of constitution.

Specifically, the radiation image read-out apparatus illustrated in FIG. 10 comprises a conveyor belt 40' for supporting the leading end portion and the tail end portion of the stimulable phosphor sheet 50' and conveying the sheet 50' in the direction indicated by the arrow Y. (No image information is stored at the leading end portion and the tail end portion of the sheet 50', or image information representing a region other than a region of interest in the radiation image is stored at the leading end portion and the tail end portion of the sheet 50'.) The radiation image read-out apparatus also comprises the BLD 11 for radiating out the linear stimulating rays L along the direction approximately normal to one surface of the sheet 50'. The radiation image read-out apparatus further comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the one surface of the sheet 50'. The radiation image read-out apparatus still further comprises the SELFOC lens array 16 having an optical axis, which is approximately normal to the one surface of the sheet 50'. The SELFOC lens array 16 converges light M', which is emitted from the other surface of the sheet 50' when the sheet 50' is exposed to the stimulating rays L (i.e., the other surface opposite to the one surface on the stimulating ray incidence side), onto the light receiving surfaces of the photoelectric conversion devices 21, 21, . . . constituting the line sensor 20. The radiation image read-out apparatus also comprises the stimulating ray cut-off filter 17 for transmitting only the emitted light M' and filtering out the stimulating rays L, which are mixed slightly in the emitted light M' impinging upon the SELFOC lens array 16. The radiation image read-out apparatus further comprises the line sensor 20, which is constituted of a plurality of the photoelectric conversion devices 21, 21, . . . for receiving the emitted light M' having passed through the stimulating ray cut-off filter 17 and for photoelectrically converting the emitted light M'. The radiation image read-out apparatus still further comprises the reading means 29 for successively reading the radiation image signal components Q, Q, . . . , which have been fed out from the photoelectric conversion devices 21, 21, . . . constituting the line sensor 20, in order to obtain the radiation image signal S1 representing the radiation image having been stored on the sheet 50.

Figure 11:
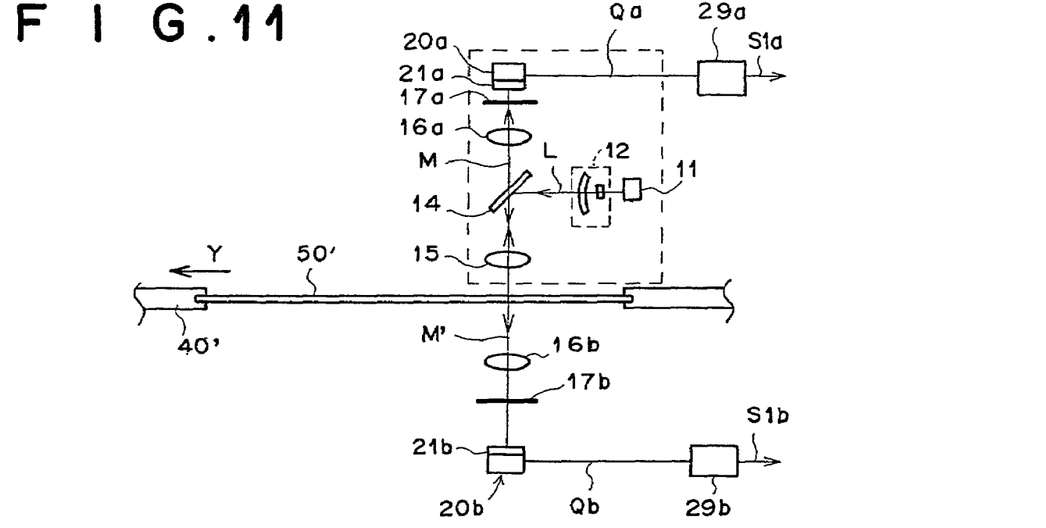
FIG. 11 is a sectional view showing a still further different example of a radiation image read-out apparatus, in which the embodiment of the signal correcting method in accordance with the present invention is employed.

Further, as illustrated in FIG. 11, the stimulable phosphor sheet 50' whose substrate is formed from a material permeable to the emitted light M may be employed, two line sensors may be located on opposite surface sides of the sheet 50', and the emitted light emanating from the two surfaces of the sheet 50' may be received by the line sensors. Thus the radiation image read-out apparatus may be constituted such that two image signals are detected from the opposite surfaces of the sheet 50'.

Specifically, the radiation image read-out apparatus illustrated in FIG. 11 comprises the conveyor belt 40' for supporting the leading end portion and the tail end portion of the sheet 50' and conveying the sheet 50' in the direction indicated by the arrow Y. The radiation image read-out apparatus also comprises the BLD 11 for radiating out the linear stimulating rays L toward one surface of the sheet 50'. The radiation image read-out apparatus further comprises the optical system 12, which is constituted of a combination of a collimator lens for collimating the linear stimulating rays L having been radiated out of the BLD 11 and a toric lens for expanding the beam only in one direction. The radiation image read-out apparatus still further comprises the dichroic mirror 14, which is located at an angle of 45 degrees with respect to the one surface of the sheet 50' and which is set so as to reflect the stimulating rays L and to transmit the emitted light M. The radiation image read-out apparatus also comprises the SELFOC lens array 15 for converging the linear stimulating rays L, which have been reflected from the dichroic mirror 14, into a linear beam extending along the direction indicated by the arrow X on the sheet 50'. The SELFOC lens array 15 also collimates the light M, which is emitted by the sheet 50' exposed to the linear stimulating rays L and which carries the radiation image information having been stored on the sheet 50'. The radiation image read-out apparatus further comprises a SELFOC lens array 16a for converging the emitted light M, which has been emitted from the one surface of the sheet 50' exposed to the stimulating rays L and which has passed through the dichroic mirror 14, onto light receiving surfaces of photoelectric conversion devices 21a, 21a, . . . constituting a line sensor 20a. The radiation image read-out apparatus still further comprises a stimulating ray cut-off filter 17a for transmitting only the emitted light M and filtering out the stimulating rays L, which are mixed slightly in the emitted light M having passed through the SELFOC lens array 16a. The radiation image read-out apparatus also comprises the line sensor 20a, which is constituted of a plurality of the photoelectric conversion devices 21a, 21a, . . . for receiving the emitted light M having passed through the stimulating ray cut-off filter 17a and for photoelectrically converting the emitted light M. The radiation image read-out apparatus further comprises reading means 29a for successively reading radiation image signal components Qa, Qa, . . . , which have been fed out from the photoelectric conversion devices 21a, 21a, . . . constituting the line sensor 20a, in accordance with the movement of the sheet 50' in order to obtain a radiation image signal S1a representing the radiation image having been stored on the sheet 50'. The radiation image read-out apparatus still further comprises a SELFOC lens array 16b for converging the light M', which is emitted from the other surface of the sheet 50' when the sheet 50' is exposed to the stimulating rays L (i.e., the other surface opposite to the one surface on the stimulating ray incidence side), onto light receiving surfaces of photoelectric conversion devices 21b, 21b, . . . constituting a line sensor 20b. The radiation image read-out apparatus also comprises a stimulating ray cut-off filter 17b for transmitting only the emitted light M' and filtering out the stimulating rays L, which are mixed slightly in the emitted light M' having passed through the SELFOC lens array 16b. The radiation image read-out apparatus further comprises the line sensor 20b, which is constituted of a plurality of the photoelectric conversion devices 21b, 21b, . . . for receiving the emitted light M' having passed through the stimulating ray cut-off filter 17b and for photoelectrically converting the emitted light M'. The radiation image read-out apparatus still further comprises reading means 29b for successively reading radiation image signal components Qb, Qb, . . . , which have been fed out from the photoelectric conversion devices 21b, 21b, . . . constituting the line sensor 20b, in accordance with the movement of the sheet 50' in order to obtain a radiation image signal S1b representing the radiation image having been stored on the sheet 50'.

In the radiation image read-out apparatuses described above, the BLD 11 acting as the line light source and the line sensor 20 (or the line sensors 20a and 20b) are kept stationary, the stimulable phosphor sheet 50 or 50' is moved, and the operation for reading out the radiation image is thereby performed. Alternatively, the stimulable phosphor sheet 50 or 50' may be kept stationary, the BLD 11 acting as the line light source and the line sensor 20 (or the line sensors 20a and 20b) may be moved, and the operation for reading out the radiation image may thereby be performed.

Figure 12:
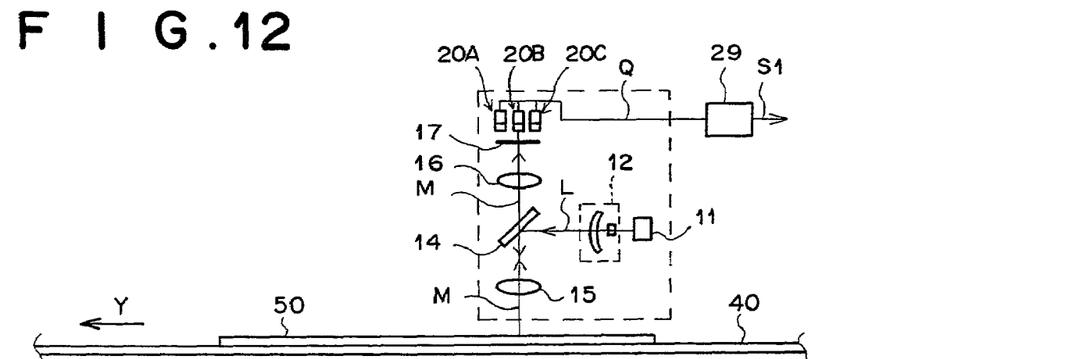
FIG. 12 is a sectional view showing a radiation image read-out apparatus, in which a different embodiment of the signal correcting method in accordance with the present invention is employed.
Figure 13:
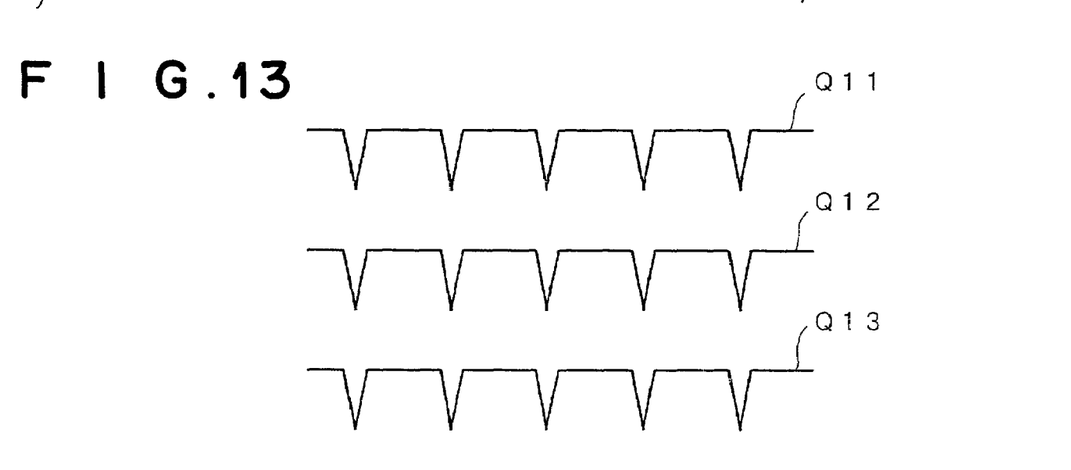
FIG. 13 is an explanatory view showing test image signal components of a test image signal representing a test image, which test image signal components have been obtained from line sensors in the radiation image read-out apparatus of FIG. 12.

As illustrated in FIG. 2, FIG. 7, and FIG. 8, in the radiation image read-out apparatuses described above, in which the embodiment of the signal correcting method in accordance with the present invention is employed, the line sensor 20, the line sensor 20, or the line sensor 220, which comprises the plurality of the arrayed line sensor constituting units 22, 22, . . . or the plurality of the arrayed line sensor constituting units 22', 22', . . . , is employed. Alternatively, as illustrated in FIG. 12, the operation for reading out the radiation image may be performed with line sensors 20A, 20B, and 20C, each of which comprises a plurality of line sensor constituting units 22, 22, . . . arrayed in a row over a length at least equal to the width of the sheet 50. Each of the line sensor constituting units 22, 22, . . . comprises a plurality of photoelectric conversion devices 21, 21, . . . In such cases, the line sensors 20A, 20B, and 20C are located in parallel so as to stand side by side with respect to the direction of movement of the sheet 50. In FIG. 12, similar elements are numbered with the same reference numerals with respect to FIGS. 1A and 1B. In the radiation image read-out apparatus of FIG. 12, the line sensors 20A, 20B, and 20C overlap one another over the entire lengths of the line sensors 20A, 20B, and 20C. Therefore, it is necessary for the position matching processing as to be performed on the radiation image signal components obtained from the line sensors 20A, 20B, and 20C. For such purposes, as in the embodiment of the signal correction method in accordance with the present invention, which us employed in the radiation image read-out apparatus of FIG. 1A, the test image T illustrated in FIG. 4 is read out with the line sensor 20A, 20B, and 20C. In this case, as illustrated in FIG. 13, test image signal components Q11, test image signal components Q12, and test image signal components Q13 are obtained respectively from the line sensors 20A, 20B, and 20C. Also, the position matching processing is performed on the radiation image signal components, which have been obtained from the line sensors 20A, 20B, and 20C, such that the positions of the peaks of the test image signal components Q11, the test image signal components Q12, and the test image signal components Q13 coincide with one another.

Figure 14:
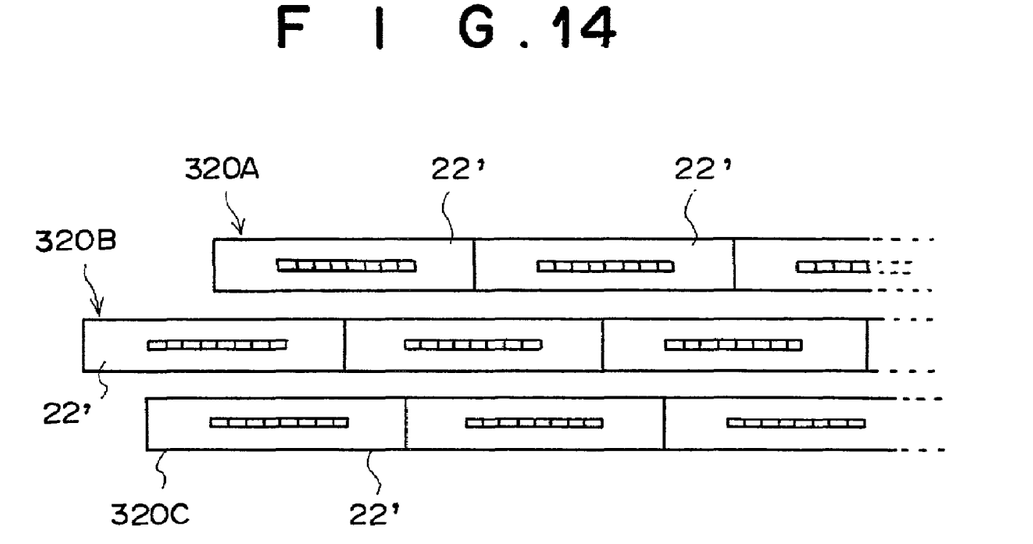
FIG. 14 is an explanatory view showing different examples of line sensors, which may be employed in the radiation image read-out apparatus of FIG. 12.

As illustrated in FIG. 14, each of line sensors 320A, 320B, and 320C may be formed with the line sensor constituting units 22', 22', ..., each of which comprises the photoelectric conversion devices 21, 21, ... arrayed only over a range shorter than the entire length of the line sensor constituting unit 22'. In such cases, the line sensors 320A, 320B, and 320C are located such that the certain regions of the effective sensor ranges of the line sensor constituting units 22', 22', 22' of the line sensors 320A, 320B, and 320C, in which effective sensor ranges the photoelectric conversion devices 21, 21, ... are arrayed, overlap one another.

What is claimed is:

1. A signal correcting method for use in a radiation image read-out apparatus, wherein position matching processing is performed on radiation image signal components of a radiation image signal representing a radiation image, which radiation image signal components have been obtained from a plurality of line sensor constituting units in the radiation image read-out apparatus comprising:
   i) a line light source for linearly irradiating stimulating rays onto an area of one surface of a stimulable phosphor sheet, on which the radiation image has been stored, the stimulating rays causing the stimulable phosphor sheet to emit light in proportion to an amount of energy stored thereon during its exposure to radiation,
   ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, the line sensor comprising the plurality of the line sensor constituting units, each of which comprises a plurality of photoelectric conversion devices arrayed along a length direction of the linear area of the stimulable phosphor sheet, the plurality of the line sensor constituting units being arrayed along the length direction of the linear area of the stimulable phosphor sheet such that certain regions of adjacent line sensor constituting units overlap each other,
   iii) scanning means for moving the stimulable phosphor sheet with respect to the line light source and the line sensor and in a direction different from the length direction of the linear area of the stimulable phosphor sheet, and
   iv) reading means for successively reading outputs of the line sensor in accordance with the movement in order to obtain the radiation image signal, which represents the radiation image, the method comprising the steps of:
   a) reading out a test image, in which edge patterns extending in a direction different from the length direction of the linear area of the stimulable phosphor sheet are embedded at positions corresponding to the overlapping regions of the line sensor constituting units, test image signal components of a test image signal, which represents the test image, being thereby acquired from each of the line sensor constituting units, and
   b) performing the position matching processing on the radiation image signal components of the radiation image signal representing the radiation image, which radiation image signal components have been obtained from the plurality of the line sensor constituting units, and in accordance with edge pattern signal components, which represent the edge patterns embedded in the test image and are contained in the test image signal components of the test image signal representing the test image, wherein the position matching processing provides position matched radiation image signal components, said position matched components become calculated to determine a mean or an interpolated value based on data corresponding to the overlapping regions of the line sensor.

2. A method as defined in claim 1 wherein the test image is formed on said stimulable phosphor sheet, and the test image signal is acquired by reading out the test image, which has been formed on said stimulable phosphor sheet.

3. A method as defined in claim 1 wherein the stimulable phosphor sheet, on which the radiation image has been stored, is provided with a region, in which the test image has been formed, the radiation image and the test image are read out from the stimulable phosphor sheet, and the radiation image signal and the test image signal are thereby obtained simultaneously.

4. The method of claim 1, further comprising an image reading step separate from reading out the test image.

5. A signal correcting method for use in a radiation image read-out apparatus, wherein position matching processing is performed on radiation image signal components of a radiation image signal representing a radiation image, which radiation image signal components have been obtained from a plurality of line sensor constituting units in the radiation image read-out apparatus comprising:
   i) a line light source for linearly irradiating stimulating rays onto an area of one surface of a stimulable phosphor sheet, on which the radiation image has been stored, the stimulating rays causing the stimulable phosphor sheet to emit light in proportion to an amount of energy stored thereon during its exposure to radiation,
   ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, the line sensor comprising the plurality of the line sensor constituting units, each of which comprises a plurality of photoelectric conversion devices arrayed along a length direction of the linear area of the stimulable phosphor sheet, the plurality of the line sensor constituting units being arrayed along the length direction of the linear area of the stimulable phosphor sheet such that certain regions of adjacent line sensor constituting units overlap each other, iii) scanning means for moving the stimulable phosphor sheet with respect to the line light source and the line sensor and in a direction different from the length direction of the linear area of the stimulable phosphor sheet, and iv) reading means for successively reading outputs of the line sensor in accordance with the movement in order to obtain the radiation image signal, which represents the radiation image, the method comprising the steps of:

a) reading out a test image, in which edge patterns extending in a direction different from the length direction of the linear area of the stimulable phosphor sheet are embedded at positions corresponding to the overlapping regions of the line sensor constituting units, test image signal components of a test image signal, which represents the test image, being thereby acquired from each of the line sensor constituting units, and b) performing the position matching processing on the radiation image signal components of the radiation image signal representing the radiation image, which radiation image signal components have been obtained from the plurality of the line sensor constituting units, and in accordance with edge pattern signal components, which represent the edge patterns embedded in the test image and are contained in the test image signal components of the test image signal representing the test image, wherein the edge pattern are provided in multiple regions of non-storable regions disposed at an edge of the stimulable phosphor, said non-storable regions disposed part-way along a length of the stimulable phosphor.

* * * * *